May 16, 1950     W. A. BAILEY     2,507,493
HEATING AND COOKING APPARATUS
Filed Oct. 12, 1946     3 Sheets-Sheet 1

INVENTOR.
WILLIAM A. BAILEY
BY Henry J. Lucke
ATTORNEY.

May 16, 1950 W. A. BAILEY 2,507,493
HEATING AND COOKING APPARATUS
Filed Oct. 12, 1946 3 Sheets-Sheet 2

INVENTOR.
WILLIAM A. BAILEY
BY Henry J. Lucke
ATTORNEY.

May 16, 1950     W. A. BAILEY     2,507,493
HEATING AND COOKING APPARATUS
Filed Oct. 12, 1946     3 Sheets-Sheet 3
FIG.3.
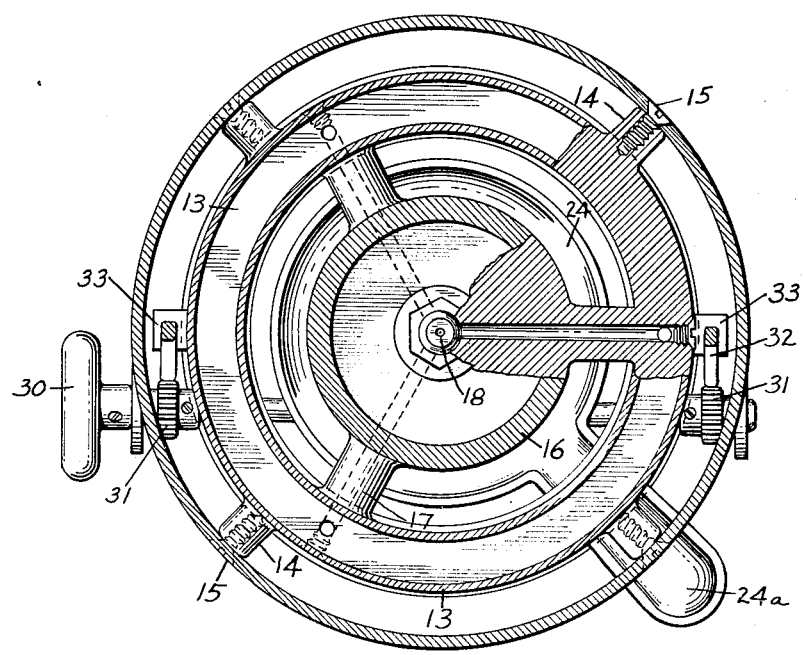
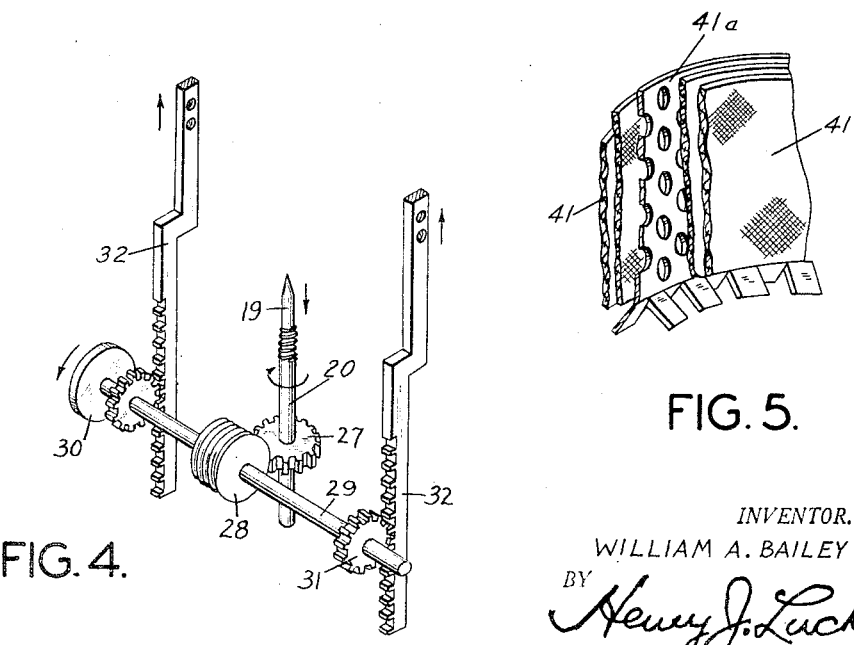
FIG.4.
FIG.5.
INVENTOR.
WILLIAM A. BAILEY
BY Henry J. Lucke
ATTORNEY.

Patented May 16, 1950

2,507,493

UNITED STATES PATENT OFFICE 2,507,493

HEATING AND COOKING APPARATUS

William A. Bailey, Bronx, N. Y.

Application October 12, 1946, Serial No. 702,933

9 Claims. (Cl. 158—72)

My invention relates to improvements in heating apparatus, and the same has for its object to provide a simple, efficient and reliable apparatus which may be employed for space heating or for cooking purposes, as desired. The present invention contemplates heating apparatus which is generally and broadly similar to that disclosed and claimed in my copending patent application, Serial No. 622,244, filed October 15, 1945, for "Portable heater and cooker."

Further, said invention has for its object to provide an apparatus of the character specified in which fuel in a solid state is employed, and rendered fluid in the apparatus in the normal course of its operation to serve as the heating medium.

Further, said invention has for its object to provide an apparatus of the character specified in which the fuel is introduced in a solid state, and converted, first into a liquid, and finally converted into a gaseous state in which it is caused to burn smokelessly with a clear, blue flame.

Further, said invention has for its object to provide an apparatus of the character specified in which the fuel, such as paraffine, wax or compounds thereof may be introduced into the apparatus and disposed in a central container or receptacle and subjected to the produced heat to render the same fluid in the course of the normal operation of the apparatus.

Further, said invention has for its object to provide an apparatus in which the fuel, in solid form, is disposed in a central container or receptacle, and as the fuel is rendered fluid, fed from the bottom of said container to a burner associated with the lower end of said container.

Further, said invention has for its object to provide an apparatus of the character specified in which the supply of liquid fuel to the burner, and the operation of the burner may be regulated and controlled simultaneously by a single or unitary control device.

Further, said invention has for its object to provide a light, portable apparatus of the character specified, which may be readily moved from place to place, and in which the fuel may be consumed without producing undue objectionable odors or smoke.

To the attainment of the aforesaid objects and ends, my invention consists in the novel features of construction, and in the combination, connection and arrangement of parts hereinafter described, and then pointed out in the claims.

In the accompanying drawings:

Fig. 3 is a top cross section on the line 3—3 of Fig. 2;

Fig. 4 is a detail perspective view of the wick and fuel valve operating mechanism;

Fig. 5 is a fragmentary perspective view of the wick and supporting means therefor.

Figure 1:
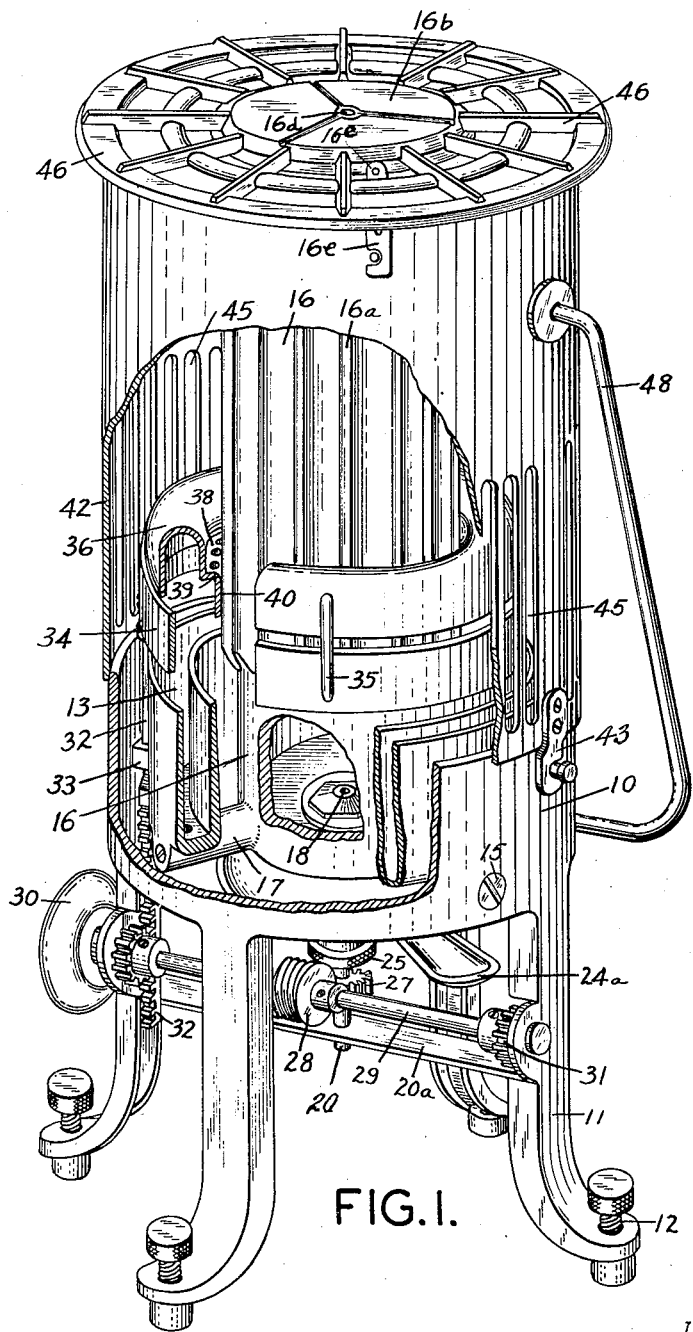
Figure 1 is a perspective view showing one form of heating apparatus constructed according to and embodying my said invention; certain parts being broken out to disclose interior parts, this view shows the parts of the heating apparatus in their respective operating positions.

The embodiment in the drawings comprises a cup-like base member 10, from the lower edge of which extend channel-shaped legs 11 provided with leveling devices 12 at their lower ends. Within the base 10 is an annular trough-shaped wick holder 13 secured concentrically in spaced relation thereto by radial arms 14 and screws 15 extending through the vertical wall portion of the base member 10.

Formed integrally with said trough-shaped wick holder 13, and disposed centrally therein is a cylindrical fuel receptacle 16 provided at its lower end with a plurality of hollow, radial arms 17 serving as conduits connected at their outer ends with the underside of said annular wick holder 13 for feeding the liquid fuel thereto. The fuel receptacle 16 is provided upon its outer surface with vertical, extended surface members or fins 16a to increase the heating surface of said receptacle, and speed up cooling process when the burner is shut off.

The fuel receptacle is provided at its top with a hinged cover 16b, and locking means 16c for holding said cover secured to said fuel receptacle. A small air vent 16d is provided in said cover 16b to prevent a vacuum in the fuel receptacle which might otherwise interfere with the flow of the liquefied fuel from the receptacle 16 to the burner.

The base of the fuel receptacle is provided with a centrally disposed fuel outlet 18 and a removable strainer or filter disk 18a having a solid central part 18b serving as a baffle for the fuel outlet 18, which communicates with the hollow radial arms or conduits 17, and a needle valve 19 having a screw-threaded stem portion 20 working in the hub 22, extends from the bottom of the fuel receptacle within the collar 23 of the priming pan 24. The priming pan 24, mainly for use when the supply of fuel runs out, is provided with a spout 24a and is secured to the hub 22 of the fuel receptacle 16 by a screw 22a. The lower end of the valve stem 20 is guided in a transverse support 20a, secured at its ends to the legs 11. The collar or hub 22 is provided with a packing nut 25 and packing 26. To the lower part of the valve stem 20 is secured a gear 27, engaging with a worm gear 28 fixed on the operating shaft 29 whose ends are supported in two legs 11 of the base 10. At one end of said operating shaft 29, outwardly of the legs 11, is fixed a hand wheel 30 for actuating said shaft and associated parts. Adjacent each end of the operating shaft 29, inwardly of the legs 11, is fixed a gear 31, meshing with a rack bar 32 whose offset upper ends extend upwardly through lugs 33 projecting from the outer side of the annular trough-shaped member 13. The said rack bars are secured at their upper ends to an annular member 34 to which is secured in vertical, spaced relation by arm 35 an annular baffle 36 of substantially inverted U-shape form in cross-section. The baffle 36 is conformed to and adapted to enclose the open upper end of the trough-shaped member 13 when said baffle 36 is adjusted to its lowermost position in which it serves as a snuffer or flame extinguisher, and to prevent the escape of smoke. The baffle 36 is provided at its inner side with a horizontally inwardly extending flanged portion 38 having a series of circular air inlet ports 39 therein, and from the edge of said flange portion 38 depends a vertical flange 40.

Within the annular trough-shaped wick holder 13 is disposed a circular wick 41, preferably formed of sections of asbestos or other suitable non-combustible material and maintained in position by a perforated support 41a.

42 denotes a cylindrical casing which corresponds in diameter with the base member 10, and is detachably secured thereto at its lower end by latches or other suitable securing devices 43. The said casing 42 is provided along its lower portion, adjacent the base member 10, with elongated vertical air intake slots 45.

The casing 42 is provided at its open top with an annular grid 46 which is hingedly secured thereto and provided with a latch or locking device 16e for holding said grid duly attached to the casing.

To facilitate the carrying or moving of the apparatus from place to place, the same is provided with a bail or handle 48 which is secured to the casing 42 adjacent the upper end thereof.

In the operation of the apparatus the fuel receptacle 16 is first filled with a solid fuel, preferably paraffine or other suitable wax or combination of waxes, preferably in the form of blocks or disks 49, and assuming that liquefied fuel has congealed upon and within the voids of the asbestos wick, the burner is lighted by removing the cylindrical casing 42 and applying a lighted match or equivalent to the wick. The casing 42 is then replaced and attached in its stated position upon the upper rim of the base member 10.

In the initial operation of the burner, i. e., at the original stage of charging the solid fuel in the fuel receptacle 16, alcohol or other priming fluid is poured into the pan 24, and ignited, whereupon the solid fuel in the receptacle 16 is liquefied and flows through the port 18 and as above described into the annular chamber 13, and thence in contact with the wick 41, and upon application of a flame to the wick, as above described, the burner is lighted.

The flow of the liquefied fuel is controlled by regulation of the hand wheel 30, in turn adjusting the valve 19 in the valve opening 18, the inlet openings 45 suplying air commensurately with the degree of the flame controlled by the regulation of the flow of the liquefied fuel, and at all stages insuring a blue flame, It will be observed that the nature of gearing of the worm wheel 28 with respect to the worm gear 27, relative to the gearing of each gear 31 with its associated rack 32, is such that when the hand wheel 30 is turned in clockwise direction, as indicated by the applied arrow in Fig. 4, the valve stem 19 is displaced downwardly and the snuffer 36, attached to the upper ends of the racks 32, is displaced upwardly. This action takes place when the burner is first lighted and when it is desired to enlarge the flame. The reverse displacement of the valve stem 19 and of the snuffer takes place upon the reverse turning of the hand wheel 30, as when reducing the flame and when it is desired to extinguish the burner.

Figures 2, 6:
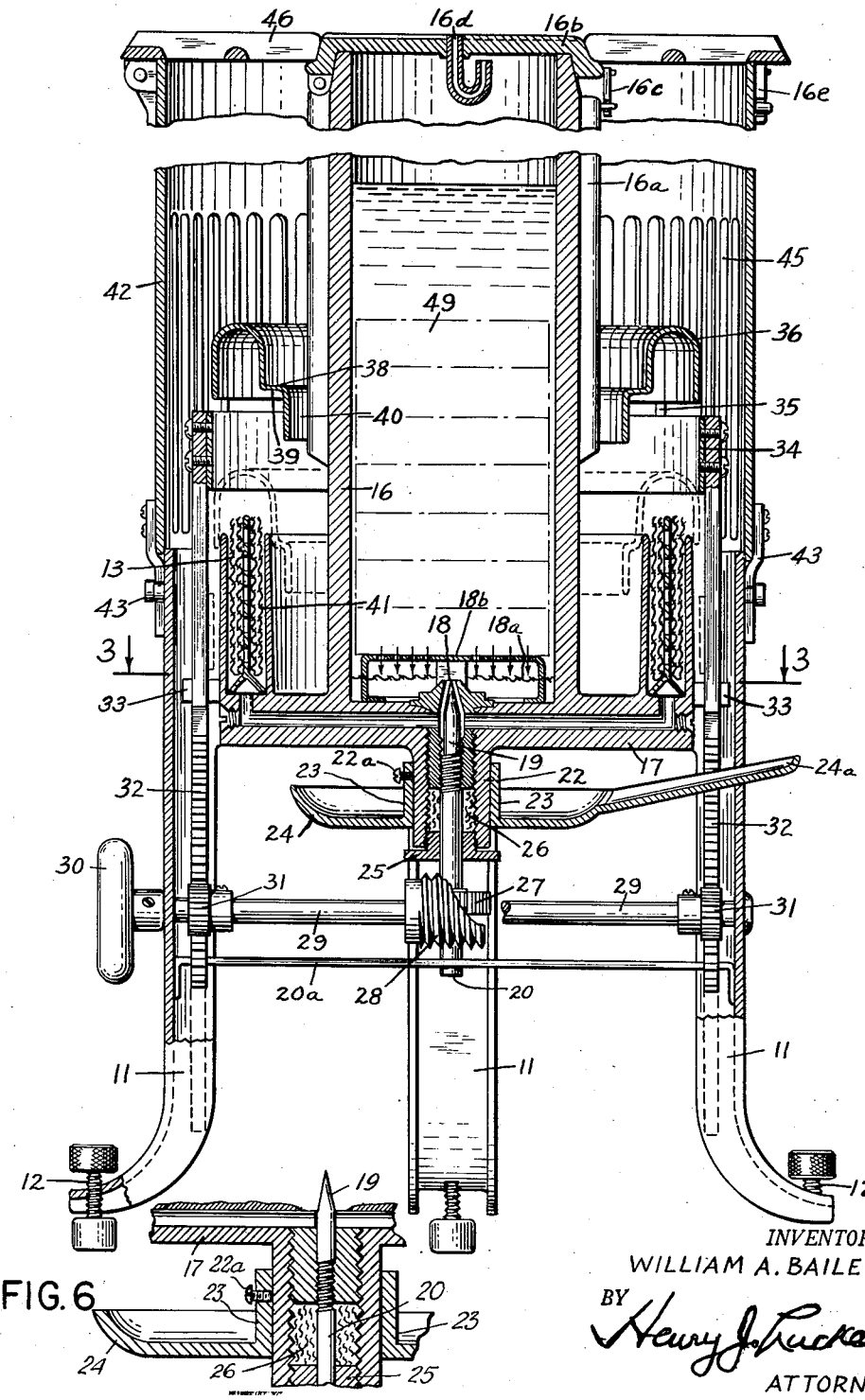
Fig. 2 is a central vertical section of Fig. 1.
Fig. 6 is a detail vertical section, on an enlarged scale, of the fuel valve assembly.

Preferably, the valve 19 in its final closing position, as indicated in Fig. 1, still affords flow of the liquefied fuel, thus insuring that the wick is supplied with fuel, after the snuffing out of the flame, such supplied fuel congealing upon the wick, preparatory for subsequent ignition. Such provision for flow of the liquefied fuel when the valve 19 is in its final closing position is effected by limiting the upward movement of the valve 19 relative to the valve opening 18. This is in turn effected by contact between the lugs 33 and their respective rack bars 32 at the points of off-set of the latter, where shoulders are formed thereon. See Figs. 2, 3 and 4. Thus the fuel may by-pass the valve 19 when the latter is in its extreme closing position and the fuel will rise to the top of the wick and congeal.

I claim:

1. An apparatus of the character described comprising a casing, a fuel receptacle disposed centrally therein, an annular burner supported adjacent the lower end of said casing, conduit means extending from the lower end of said fuel receptacle to said burner for feeding fuel thereto, means for controlling the supply of fuel to said burner, means for adjusting said burner, and actuating means for simultaneously operating said fuel-supply controlling means and said burner-adjusting means.

2. An apparatus of the character described, comprising a base, a casing mounted upon said base, a fuel receptacle supported upon said base within said casing, a burner on said base surrounding the lower end of said fuel receptacle, conduit means connecting said fuel receptacle with said burner, valve means for controlling the supply of fuel to said burner, and means for controlling said valve.

3. An apparatus of the character described, comprising a base, a casing mounted upon said base, a fuel receptacle supported upon said base within said casing, a burner on said base surrounding the lower end of said fuel receptacle, conduit means connecting said fuel receptacle with said burner, valve means for controlling the supply of fuel to said burner, means for controlling said valve, and means supported beneath the base of said apparatus for receiving fuel to initiate the operation of the burner.

4. An apparatus of the character described, comprising a base, a casing mounted upon said base, a cylindrical fuel receptacle supported upon said base; said fuel receptacle being open at its top and provided with a cover, and provided at its base with a fuel outlet, a trough-shaped wick holder surrounding the lower end of said fuel receptacle, conduit means connecting said fuel receptacle with said wick holder, a baffle disposed above said wick holder; a valve for controlling the supply of fuel from said fuel receptacle to said wick holder, means for adjusting said baffle relative to said wick holder and wick, and means for simultaneously actuating said valve and said baffle adjusting means.

5. An apparatus of the character described comprising a base, a casing conformed to and mounted upon said base, a cylindrical fuel receptacle supported upon said base and disposed centrally relative to said casing; said fuel receptacle being open at its top and provided with a cover, and provided at its base with a fuel outlet, a burner on said base surrounding the base of said fuel receptacle, conduit means connecting said fuel receptacle with said burner, a valve for controlling the supply of fuel to said burner, said burner including an annular trough-shaped member, a wick in said trough-shaped member and an annular baffle conformed to and adapted to enclose the open end of said annular trough-shaped member, said baffle having secondary air passages therein, means on said baffle for adjusting the same relative to said trough-shaped member, a shaft supported on said base, means on said shaft for actuating said fuel supply valve and for actuating said baffle to control said burner, and means for operating said shaft.

6. An apparatus of the character described comprising a base, a casing conformed to and mounted upon said base, a cylindrical fuel receptacle supported upon said base and disposed centrally relative to said casing; said fuel receptacle being open at its top and provided with a cover, and provided at its base with a fuel outlet, a burner on said base surrounding the base of said fuel receptacle, conduit means connecting said fuel receptacle with said burner, a valve for controlling the supply of fuel to said burner, said burner including an annular trough-shaped member, a wick in said trough-shaped member and an annular baffle conformed to and adapted to enclose the open end of said annular trough-shaped member, said baffle having secondary air passages therein, means on said baffle for adjusting the same relative to said trough-shaped member, a priming pan disposed below said burner for receiving fuel to initiate the operation of the apparatus when cold, a shaft supported on said base, means on said shaft for actuating said fuel supply valve and for actuating said baffle to control said burner, and means for operating said shaft.

7. An apparatus of the character described comprising a casing, an annular burner supported adjacent the lower end of said casing, a fuel receptacle disposed centrally of said burner, and conduit means extending from the lower end of said fuel receptacle to said burner for feeding fuel thereto, said fuel feeding means including a conical valve seat, a needle valve member displaceable relative to said valve seat, and means for restricting the upward movement of said valve member to a position spaced from said valve seat.

8. An apparatus of the character as set forth in claim 7, wherein said restricting means includes a rack provided with a shoulder and a stop carried by the casing serving to restrict the upward movement of said rack.

9. An apparatus of the character as set forth in claim 7, wherein said restricting means includes a rack provided with a shoulder and a stop carried by the casing serving to restrict the upward movement of said rack and further including gearing co-ordinated with said rack, said gearing controlling the upward movement of said displaceable valve member.

WILLIAM A. BAILEY.

REFERENCES CITED

The following references are of record in the file of this patent:

UNITED STATES PATENTS

| Number | Name | Date |
|---|---|---|
| 60,680 | Brown | Jan. 1, 1867 |
| 398,715 | Fest | Feb. 26, 1889 |
| 1,905,067 | Sherrick | Apr. 25, 1933 |
| 2,095,403 | Williams | Oct. 12, 1937 |
| 2,202,923 | Reeves | June 4, 1940 |
| 2,215,767 | Richardson | Sept. 24, 1940 |
| 2,215,768 | Richardson | Sept. 24, 1940 |
| 2,219,170 | Bailey | Oct. 22, 1940 |

FOREIGN PATENTS

| Number | Country | Date |
|---|---|---|
| 100,163 | Germany | Dec. 16, 1898 |
| 188,229 | Great Britain | Nov. 9, 1922 |